US012779464B2

(12) United States Patent
Fratzl et al.

(10) Patent No.: US 12,779,464 B2
(45) Date of Patent: Nov. 3, 2026

(54) CARTRIDGE COMPRISING A PLURALITY OF ANALYSIS CHAMBERS FOR RECEIVING A BIOLOGICAL LIQUID

(71) Applicant: Magia Diagnostics, Echirolles (FR)

(72) Inventors: Mario Fratzl, Grenoble (FR); Sarah Delshadi, Grenoble (FR); Paul Kauffmann, Eybens (FR)

(73) Assignee: Magia Diagnostics, Echirolles (FR)

( * ) Notice: Subject to any disclaimer, the term of this patent is extended or adjusted under 35 U.S.C. 154(b) by 597 days.

(21) Appl. No.: 18/252,752

(22) PCT Filed: Nov. 9, 2021

(86) PCT No.: PCT/FR2021/051978

§ 371 (c)(1),
(2) Date: May 12, 2023

(87) PCT Pub. No.: WO2022/106770

PCT Pub. Date: May 27, 2022

(65) Prior Publication Data

US 2023/0415156 A1 Dec. 28, 2023

(30) Foreign Application Priority Data

Nov. 17, 2020 (FR) ....................................... 2011788

(51) Int. Cl.
*B01L 3/00* (2006.01)

(52) U.S. Cl.
CPC ..... *B01L 3/50273* (2013.01); *B01L 3/502723* (2013.01); *B01L 2200/04* (2013.01); (Continued)

(58) Field of Classification Search
None
See application file for complete search history.

(56) References Cited

U.S. PATENT DOCUMENTS 6,637,463 B1 10/2003 Lei et al.
2002/0036018 A1 3/2002 McNeely et al.
(Continued)

FOREIGN PATENT DOCUMENTS

EP 2852959 A1 4/2015
EP 3447492 A1 2/2019
(Continued)

OTHER PUBLICATIONS

Aldo et al. "Simple PlexTM: A Novel Multi-Analyte, Automated Microfluidic Immunoassay Platform for the Detection of Human and Mouse Cytokines and Chemokines." Am J Reprod Immunol. May 11, 2016;75(6):678-693. (Year: 2016).*
(Continued)

*Primary Examiner* — Maris R Kessel
*Assistant Examiner* — May Leung Chiu
(74) *Attorney, Agent, or Firm* — TraskBritt

(57) ABSTRACT

A cartridge for analyzing a biological fluid, comprises an array of channels defining a plurality of analysis paths. Each channel is defined by at least two channel walls facing each other and defining a channel height. A wall of at least one channel has a step for defining on either side of the step: —a first segment of the channel wherein the wall has a first surface energy and a first elevation defining a first height of the channel; —a second segment of the channel wherein the wall has a second surface energy and a second elevation defining a second height of the channel. The first height of the channel and the first surface energy of the wall are greater than the second height of the channel and the second surface energy, respectively.

20 Claims, 4 Drawing Sheets

(52) U.S. Cl.
CPC .................. *B01L 2200/0684* (2013.01); *B01L 2300/0864* (2013.01); *B01L 2300/0887* (2013.01); *B01L 2300/161* (2013.01); *B01L 2400/0406* (2013.01); *B01L 2400/088* (2013.01)

(56) References Cited

U.S. PATENT DOCUMENTS

| | | | | |
|---|---|---|---|---|
| 2002/0124896 | A1* | 9/2002 | O'Connor | B01F 25/432 137/833 |
| 2003/0127610 | A1* | 7/2003 | Gallagher | G01B 11/14 250/574 |
| 2004/0028566 | A1 | 2/2004 | Ko et al. | |
| 2009/0220948 | A1* | 9/2009 | Oviso | B01L 3/502746 436/71 |
| 2015/0235763 | A1 | 8/2015 | Dempsey et al. | |
| 2017/0282175 | A1 | 10/2017 | Ho et al. | |
| 2019/0030535 | A1 | 1/2019 | Smith et al. | |
| 2020/0030797 | A1 | 1/2020 | Shartle et al. | |

FOREIGN PATENT DOCUMENTS

| | | | |
|---|---|---|---|
| FR | 2897282 | A1 | 8/2007 |
| JP | 2005-030906 | A | 2/2005 |
| JP | 2005-529544 | A | 9/2005 |
| WO | 01/85602 | A1 | 11/2001 |
| WO | 2012/120101 | A1 | 9/2012 |

OTHER PUBLICATIONS

Fratzl et al., Magetophoretic Induced Convective Capture of Highly Diffusive Superparamagnetic Nanoparticles, Soft Matter, Issue 14, (2018).

International Search Report for International Application No. PCT/FR2021/051978 dated Mar. 25, 2022, 3 pages.

International Written Opinion for International Application No. PCT/FR2021/051978 dated Mar. 25, 2022, 6 pages.

Japanese Notice of Reason for Refusal for Application No. 2023-529912 dated Oct. 21, 2025, 4 pages.

International Preliminary Report on Patentability for International Application No. PCT/FR2021/051978, mailed Sep. 13, 2022, 51 pages (5 pages of English Translation and 46 pages of Original Document).

Zanini, L. F., et al., "Autonomous micromagnet based systems for highly efficient magnetic separation Articles You May Be Interested In Autonomous micromagnet based systems for highly efficient magnetic separation", Appl. Phys. Lett. Appl. Phys. Lett., Jan. 1, 2011, pp. 232504-232504.

Chinese First Office Action for Application No. 202180077423. 1dated Jun. 25, 2025, 6 pages.

Fratzl et al., Magetophoretic Induced Convective Capture of Highly Diffusive Superparamagnetic Nanoparticles, Soft Matter, Issue 14, (2018), 11 pages.

* cited by examiner

CARTRIDGE COMPRISING A PLURALITY OF ANALYSIS CHAMBERS FOR RECEIVING A BIOLOGICAL LIQUID

CROSS-REFERENCE TO RELATED APPLICATIONS

This application is a national phase entry under 35 U.S.C. § 371 of International Patent Application PCT/FR2021/051978, filed Nov. 9, 2021, designating the United States of America and published as International Patent Publication WO 2022/106770 A1 on May 27, 2022, which claims the benefit under Article 8 of the Patent Cooperation Treaty to French Patent Application Serial No. FR2011788, filed Nov. 17, 2020.

TECHNICAL FIELD

The technical field of the present disclosure is that of biological analysis in order to detect the presence and/or concentration of an analyte in a sample of biological liquid. The present disclosure relates more particularly to a cartridge comprising a plurality of analysis chambers for receiving the biological liquid. The cartridge is preferably intended to be used in a portable analysis device of the "Point of Care" type, that is to say making it possible to carry out and interpret a test on-site to make an immediate clinical decision, at the patient's bedside rather than in a central laboratory. It can also be used in any other type of biological analysis, for example, for molecular biological analyses or cell analyses.

BACKGROUND

Document EP3447492 discloses a method for capturing and detecting a molecule, often referred to as an "analyte," in a sample of a biological liquid. The principles for capturing and detecting patterns implemented by this method are also explained in the article by Fratzl et al, "Magnetophoretic induced convective capture of highly diffusive supermagnetic nanoparticles," Soft Matter, 14. 10.1039/C7SM02324C. According to this method, the sample is mixed with magnetic particles of nanometric or, more generally, submicrometer size, respectively coupled to capture elements capable of binding to the molecule whose presence is to be detected or quantified. The molecule to be detected, the analyte, may be an antigen and the element an antibody, but the reverse configuration is also possible. Detection elements are also introduced into the sample, for example, a detection antibody carrying a photoluminescent marker, for example, fluorescent. In the solution, complexes formed of the capture element, the analyte and the detection element are thus formed, which are then immobilized on a support comprising magnetic micro-sources ordered according to a specific spatial pattern. The pattern is defined by strong magnetic field zones and weak magnetic field zones inducing significant magnetic field gradients. The complexes entrained by the magnetic particles tend to agglomerate on the support at the zones where the norm of the magnetic field is maximum. The photoluminescent (and especially fluorescent) markers can make the specified spatial pattern apparent, which marks the presence of the analyte in the solution. The mean (spatially) intensity of this light pattern is usually referred to as "specific signal."

In most cases, and particularly when the analyte is absent from the sample or when its quantity is limited in the sample, the unbound detection elements bearing the photoluminescent markers remain dispersed in suspension in the solution. They contribute to forming a relatively homogeneous light background. The mean (spatially) intensity of this light background forms a signal called "signal of the supernatant." Besides the unbound photoluminescent markers, this light background is also formed by the light intensity emitted by all the photoluminescent materials of the sample. The capture elements not bound to the analyte and to the detection element are also immobilized on the support, but do not carry markers; they do not contribute to the light pattern or to the light background.

The spatial arrangement in the plane of the support of the magnetic field microsources and the light intensity of the patterns exposed by the photoluminescent markers make it possible to carry out a detection and a quantification of the analyte in the sample without washing, that is to say without eliminating the liquid solution after having immobilized the complexes on the surface of the support, which is particularly advantageous. To enable this detection, the sample and the surface of the support are illuminated in order to allow the detection of the photoluminescent markers, and the acquisition of a digital image is carried out. This digital image therefore has a spatially variable intensity (in the plane of the image) depending on the intensity of the magnetic field produced by the support. The image is processed to identify this spatial variation, and to determine the specific signal and the signal of the supernatant, and the specific signal/signal of the supernatant ratio makes it possible to conclude that the analyte is present in the sample or even to estimate the concentration thereof.

The simplicity of this approach, and, in particular, the absence of a washing step, allows its integration into an autonomous, portable or transportable immunological analysis device "at the patient's bedside," in the field and without a pump or valve, whereas traditionally this type of analysis is conducted in a central laboratory.

To allow the application of the detection method, the biological liquid is introduced into a cartridge comprising a plurality of analysis chambers, this cartridge being intended to be inserted into the analysis device. The plurality of analysis chambers makes it possible to conduct several analyses from a sample of biological liquid, each analysis being able to be independently carried out on samples respectively held in each of the chambers.

The cartridge comprises a pour opening for the liquid, a plurality of vents arranged downstream of the analysis chambers and an array of channels for fluidly connecting the opening to the analysis chambers. The sample of biological liquid poured into the opening propagates by capillary action in the array of channels to fill the chambers; however, it has been observed that the propagation of the liquid in the array of channels was not identical from one channel to another. The flow may favor certain channels, which may lead to an overflow of the liquid from the cartridge. More generally, some chambers can fill more slowly, or even do not completely fill. As a result of this phenomenon, the analyses are delayed, or even sometimes impossible to carry out at least on some of the analysis chambers of the cartridge.

Document US 2004/028566 relates to a microfluidic device and aims to control the flow of the fluid in this device by combining a displacement of this fluid by pressure forces exerted by an external pump. More specifically, this document aims to make it possible to inject and control the flow of a plurality of fluids in an analysis cartridge in several directions. One flow is made by capillary action, the other is forced by an external pressure.

BRIEF SUMMARY

One aim of the present disclosure is therefore to provide at least a partial solution to this problem. More specifically, an object of the present disclosure is to provide a cartridge intended to be used in a portable immunological analysis device of the "Point of Care" type and comprising a plurality of analysis chambers, these chambers being able to be filled by capillary action of a biological liquid in a reliable, repeatable manner and during a filling period whose duration is controlled. One aim of the present disclosure is therefore to better control the propagation of the biological liquid by capillary action in the cartridge. Advantageously, the immunological analysis is magnetic, implementing magnetic particles to mark the presence of the analyte in a sample of biological liquid.

With a view to achieving this aim, the object of the present disclosure proposes an optical analysis cartridge for analyzing a biological liquid comprising a liquid pour opening emptying into an array of channels in which the liquid seeps by capillary action, the array of channels defining a plurality of analysis paths each comprising an analysis chamber. The array of channels comprises, for each analysis path, an upstream channel for fluidly connecting the opening to the analysis chamber, and a vent channel for fluidly connecting the analysis chamber to a vent. The cartridge includes a support having a main surface and an upper cover formed at least in part of a transparent material and also having a main surface. The upper cover and the support are assembled one to another by their main surface. At least a portion of the array of channels comprises complementary recesses formed in part on the main surface of the support and in part on the main surface of the upper cover, each channel then being defined by a channel wall referred to as "structured wall" provided by the support and by an opposite channel wall provided by the upper cover, the two walls facing each other and defining a channel height. The structured wall has a step for defining on either side of the step: a first segment of the channel in which the structured wall has a first surface energy and a first elevation defining a first height of the channel; a second segment of the channel wherein the structured wall has a second surface energy and a second elevation defining a second height of the channel. The first height of the channel and the first surface energy of the structured wall are greater than the second height of the channel and the second surface energy, respectively. The support further comprises: a rigid substrate having the first surface energy, the substrate incorporating a magnetic layer disposed under a non-magnetic film covering the magnetic layer; and an interlayer film having the second surface energy, the film disposed on the substrate, the interlayer film defining part of the fluid array of the cartridge and having a cutout pattern for forming the recesses of the support and uncovering an exposed surface of the substrate. The main surface of the support includes an exposed surface of the interlayer film having the second energy of surface and the exposed surface of the substrate having the first surface energy.

Advantage is taken of the claimed features in order to control the propagation of the biological liquid in the fluidic array of the cartridge, and, in particular, to promote the loading of the chambers of the array with biological liquid in a reliable, repeatable manner and during a filling period whose duration is controlled.

According to other advantageous non-limiting features of the present disclosure, taken alone or according to any technically feasible combination:

- the wall facing the structured wall is planar and has a third surface energy greater than the first surface energy and the second surface energy;
- the step has a flank, and the surface energy of the flank of the step is closer to the first energy than the second energy;
- the main surfaces of the support and of the upper cover have a hydrophilic character;
- the channel array includes an upstream channel for fluidly connecting the opening to the analysis chamber, and a venting channel for fluidly connecting the analysis chamber to a vent;
- a step is arranged in at least one vent channel and it tends to reduce the height of this channel in the direction of flow of the fluid;
- the analysis cartridge comprises at least one incubation chamber fluidly arranged upstream of the analysis chamber of an analysis path;
- the analysis chamber and/or the incubation chamber comprises at least one reagent;
- the reagent comprises photoluminescent markers, and the upper cover, at least for the portion that overhangs the analysis chambers, is formed from a material transparent in the wavelength range of the photoluminescent markers;
- the upper cover has at least a portion of an external surface that is optically polished;
- the opening is surmounted by a reservoir and the vents are respectively surmounted by peripheral walls having a height at least equal to a height of the reservoir;
- the interlayer film is an adhesive film, advantageously a double-sided adhesive film;
- the magnetic layer comprises magnetically polarized regions defining a specific detection pattern.

According to another aspect, the present disclosure relates to a method for manufacturing this analysis cartridge, the method comprising providing the support and the upper cover and assembling the support to the upper cover by placing their respective main surfaces facing one another and thus forming the facing walls that define the channels.

BRIEF DESCRIPTION OF THE DRAWINGS

Other features and advantages of the present disclosure will emerge from the following detailed description of embodiments of the present disclosure with reference to the accompanying figures, in which.

DETAILED DESCRIPTION

Figure 1A:
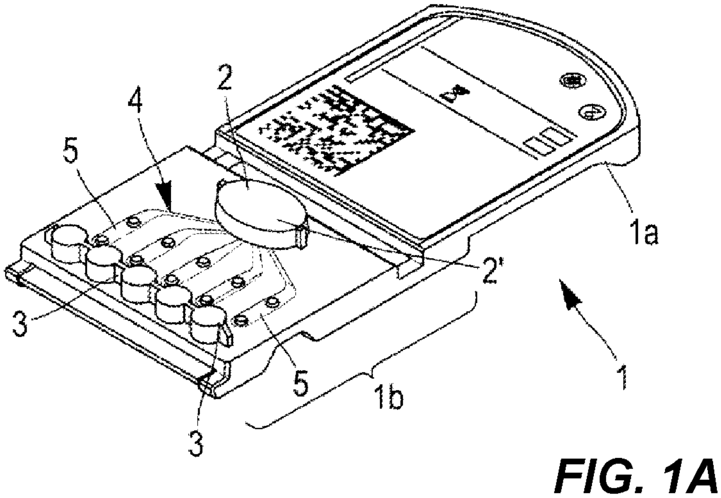
FIGS. 1A and 1B show a cartridge according to the present disclosure respectively in perspective and in exploded view.
Figure 1B:
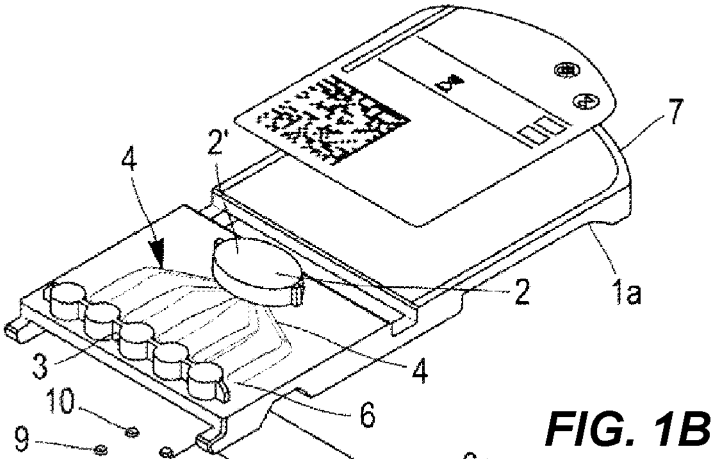

FIGS. 1A and 1B show a cartridge 1 for receiving samples of a biological liquid, which is likely to contain an analyte that is to be detected or whose concentration is desired to be determined. This cartridge 1 comprises a gripping end 1*a*, which makes it possible to manipulate the cartridge 1. The gripping end of the cartridge here bears a label, arranged on the side of the upper face of the cartridge and, in particular, making it possible to identify the cartridge 1 using an identification mark, for example, a QR code, or to carry any other type of information.

The cartridge 1 also comprises a microfluidic part 1*b*. This part extends along a main plane intended to be positioned horizontally. As shown schematically in FIG. 1C, the microfluidic part 1*b* comprises a pour opening 2 for pouring the biological liquid into the cartridge 1, for example, via a pipette. The opening 2 opens into an array of channels 4, 4' extending in the main plane of the cartridge 1 and allowing the flow and distribution of the biological liquid into a plurality of analysis chambers 5 via channels 4, called "upstream" channels of the array of channels.

The array of channels of the cartridge 1 also comprises vent channels 4', which fluidly and respectively connect the analysis chambers 5 to vents 3, these vents making it possible to force the air from the fluid array of the cartridge 1 as the biological liquid progresses into this array.

The sample analyzed is formed of the biological liquid that fills a chamber 5, and the shown cartridge 1 therefore makes it possible to conduct a plurality of analyses on the biological liquid, an analysis being able to be independently conducted on the samples respectively held in the chambers 5. The opening 2, the vents 3 and the array of channels 4, 4' connecting the opening 2 to the vents 3 define a plurality of analysis paths of the cartridge 1.

Figure 1C:
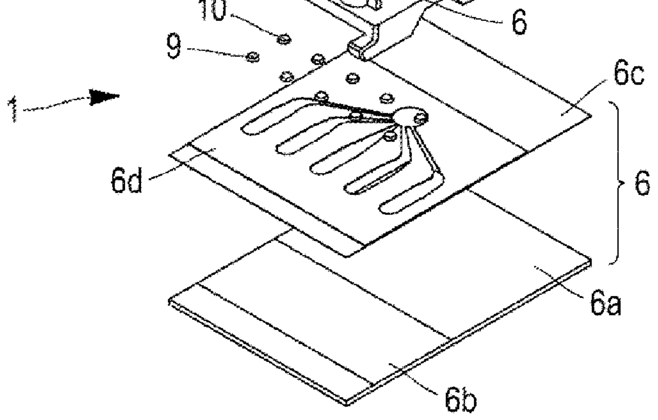
FIG. 1C schematically shows an example of a fluid array of a cartridge according to the present disclosure.

In the example shown in FIGS. 1A and 1B, the opening 2 is surmounted by a reservoir 2', projecting from an upper face of the cartridge 1. The reservoir has sufficient capacity to hold a volume of biological liquid at least equal to the volume of the fluid array of the cartridge 1 (that is to say, the array of channels 4, the analysis chambers 5 and the vent channels 4' as shown in FIG. 1C). This volume may typically be between 5 $mm^3$ and 500 $mm^3$, and, more specifically, between 20 $mm^3$ and 100 $mm^3$.

Similarly, the vents 3 are respectively surmounted by peripheral walls in order to retain an excess volume of biological liquid, according to the principle of communicating vessels. Advantageously, these walls having a height at least equal to the height of the reservoir 2' in order to prevent the liquid from escaping from the cartridge, which could pose health problems, or even damage an analysis device wherein the cartridge is intended to be inserted.

By way of illustration, the cartridge 1 can have a size of between 2 cm and 10 cm in width and in length, and have a thickness of between 4 mm and 10 mm. Each chamber 5 may have a volume typically between 1 and 50 $mm^3$ in order to receive the sample, advantageously between 5 and 25 $mm^3$.

The cartridge 1 is formed of a support 6 and an upper cover 7 covering the support. The support 6 and the upper cover 7 are assembled together by placing their surfaces, referred to as "main" surfaces, facing one another. The fluid array of the cartridge 1 is defined by recesses formed on the main surface of the support 6 and/or on the main surface of the upper cover 7, that is to say on the main faces of these two elements that are intended to be assembled together. Each channel of the array 4, 4' is defined by two channel walls, these walls facing each other and defining a channel height, and by two side walls defining a channel width. The walls are formed of the main surfaces of the support 6 and of the upper cover 7, at their recesses. The same applies for the analysis chambers 5 of the cartridge 1 and for any other element of the fluid array of this cartridge 1.

The upper cover 7, at least for the part that overhangs the analysis chambers 5, is formed of a transparent material in the emission wavelength range of the photoluminescent markers when the cartridge is used for the immunological analysis presented in the introduction of this disclosure. It may be a plastic material, for example, based on polycarbonate, cyclo-olefin copolymer or polystyrene. It may also be glass. The outer surface of the upper cover 7 is optically polished at least in front of the analysis chambers 5. These features enable and promote the optical analysis of the samples of biological liquid contained in the chambers 5, as will be explained in a subsequent section of this description.

The fluid array, such as the one presented in FIG. 1C by way of illustration, therefore extends in the main plane of the cartridge 1. The fluid array is of millimetric size, that is to say that the width of the channels of the array 4, 4' and of the analysis chambers 5 is typically between 0.1 and 10 mm. The height of these elements, that is to say their extent in a direction perpendicular to the main plane of the cartridge 1, is also millimetric, between 0.1 and 10 mm. The biological liquid propagates in this array by capillary action.

According to an important feature of the cartridge 1, one of the walls defining the height of at least one channel, referred to as "structured wall," has a step and the energy of the upstream and downstream surfaces of the step is controlled in order, selectively, to accelerate or slow down the propagation of the fluid in the channel. For the sake of simplicity, "surface energy" means the surface energy between the surface considered and the biological liquid.

A cartridge 1 according to the present disclosure takes advantage of this feature in order to promote the loading of the chambers 5 of the fluid array with biological liquid, and, more generally, to control the propagation of this liquid in the fluid array of the cartridge.

Figure 2A:
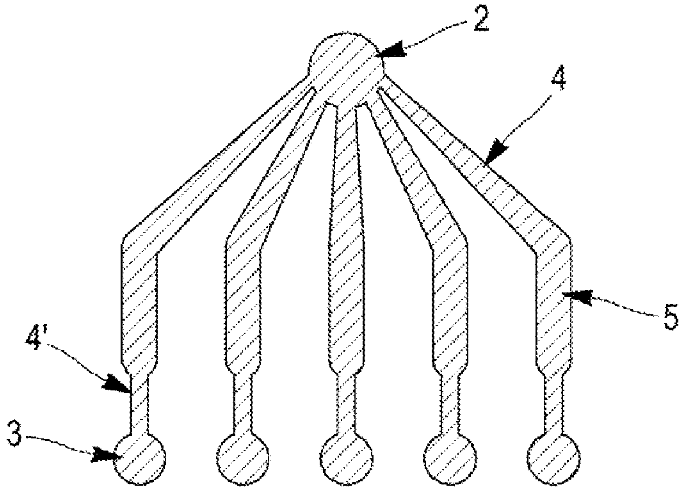
FIG. 2A shows a longitudinal cross-section of a channel implementing a feature making it possible to slow down or accelerate the flow of the biological fluid.

More precisely, and with reference to FIG. 2A, at least one channel of the cartridge 1 comprises a step M, which defines a first segment S1 of the channel wherein the structured wall (here formed by the main surface of the support 6) has a first surface energy E1 and a first elevation e1 defining a first height of the channel h1. The step M also defines a second segment S2 of the channel wherein the structured wall has a second surface energy E2 and a second elevation e2 defining a second height of the channel h2. The first height h1 of the channel and the first surface energy E1 of the structured wall are respectively greater than the second height h2 of the channel and the second surface energy E2 of the second segment S2.

The variation in height of the channel, combined with the variation of the energy of the upstream and downstream surfaces of this variation, makes it possible to influence the flow of the fluid in the channel.

Thus, when the fluid encounters an "upward" step, that is to say it flows by capillary action from the first section S1 of the channel to the second S2, its flow is slowed down by the height restriction formed by the step combined with the lower surface energy of the second segment. Conversely, when the fluid encounters a "downward" step, that is to say that it flows by capillary action from the second section S2 of the channel to the first S1, its progression is accelerated.

It is recalled that surface energy density is a positive magnitude that characterizes an interface, here the interface between the surface of the structured wall and the biological liquid. It can be determined, as is well known per se, by measuring the contact angle of a water drop, arranged on the surface whose energy is to be measured. A high contact angle, greater than 90°, indicates a low surface energy density, and the surface is said to be hydrophobic. Conversely, a contact angle of less than 90° indicates a high surface energy density, and is a so-called hydrophilic surface. A relatively more hydrophobic surface will tend to slow the progression of a fluid by capillary action in comparison with the progression of the fluid on a relatively more hydrophilic surface.

Figure 2B:
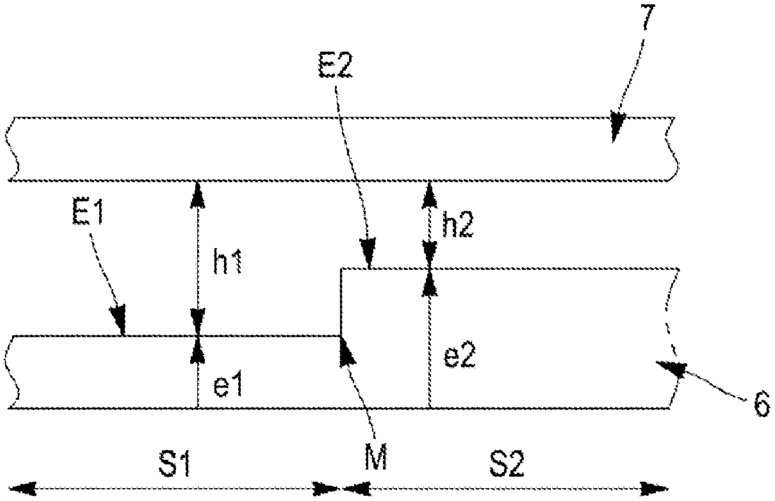
FIG. 2B shows a longitudinal cross-section of a vent channel comprising a height restriction in the form of a step.

By way of illustration of these principles, an "upward" step has been presented in FIG. 2B in a vent channel 4' of the cartridge, that is to say a channel arranged between an analysis chamber 5 and a vent 3. The fluid therefore progresses in this channel toward the vent 3. The step formed on the support 6 defines an upstream section of the venting channel (the first segment of the channel, in order to use the terms of the general principles of the present disclosure) which has, on the support 6, a greater surface energy than the surface energy of the downstream section (on the side of the vent 3, the second segment) of the channel 4'. Advantageously, it is possible to provide such a step in each vent channel 4' of the cartridge 1, in each of the analysis paths of the cartridge.

These features of the cartridge 1 have the effect of slowing the progression of the biological liquid when it encounters the step, after it has progressed by capillary action along a channel of the array 4 and through the analysis chamber 5. This slowing effect, when it occurs in a vent channel 4' that is filled more quickly than the others, leads to forcing the flow of the liquid into the other channels of the array (that is, supplying the other analysis chambers 5 of the cartridge 1) and to balancing the progression of the liquid in each of these paths. These features of the vent channel or vent channels 4' therefore ensure the filling of the analysis chambers 5 with biological liquid in a reliable, repeatable manner and during a filling period the duration of which is controlled. Provision could be made for the "upward" step (s) to be arranged in an upstream channel 4 or in a plurality of upstream channels 4, rather than in the vent channels 4'. Some of these steps may be arranged in an upstream channel 4, and others in a downstream vent channel 4'.

More generally, a cartridge 1 according to the present disclosure may have one or a plurality of steps in each upward and/or downward analysis path. It is thus possible to provide that a "downward" step be arranged in the upstream channel 4 supplying a chamber 5 of an analysis path, and that an "upward" step be arranged, in this same analysis path or in another, in the vent channel 4' connecting this chamber 5 to the vent 3.

Advantageously, and as shown in FIGS. 2A and 2B, the step causes a sudden variation in height of the channel wherein it is situated, the flank of the step forming an angle of 90° with the wall; however, more generally, this flank may form an angle of between 60° and 90°. This step may be formed on the support 6, as shown in FIGS. 2A and 2B, but it is possible to envisage forming it entirely or partly on the opposite wall, on the side of the upper cover 7. It may have a height of between 0.1 and 0.5 mm in order to effectively slow or accelerate the progression of the liquid.

Advantageously, the flank of the step has a surface energy closer to the first surface energy E1 than to the second surface energy E2.

The main surfaces of the support 6 and of the upper cover 7 (and therefore the walls of the channels 4, 4' and of the chambers 5 of the cartridge 1) are preferably chosen or treated so that they are hydrophilic. This feature generally makes it possible to facilitate the progression of the fluid in the fluid array by capillary action. Surprisingly, it is not necessary for the difference between the first surface energy E1 of the first segment S1 and the second surface energy E2 of the second segment S2 of the channel to be very great. In particular, it is not necessary for the second surface energy E2, on the "high" section of the step, to be hydrophobic in order to restrain the progression of the liquid. Measured as contact angle, the difference between these two energies E1, E2 may be 5° or more, or 10° or more and these energies confer a hydrophilic nature to the surfaces, that is, the contact angle remains less than 90°. By way of example, the first segment S1 may have a contact angle, characterizing the first energy E1, of between 50° and 80°, and the second segment S2 has a contact angle of between 65° and 89° (while maintaining a difference of at least 5°). A detailed example of the preparation of a support 6 making it possible to control the first and second surface energies E1, E2 according to what has just been presented will be given in the remainder of this description.

Advantageously, the wall opposite the structured wall has a third surface energy greater than the first surface energy E1 and the second surface energy E2. It may be between 15° and 65° (while remaining advantageously greater than the first and second surface energies), and advantageously less than 50°, or even close to or less than 35°. This energy leads to forming a surface on this opposite wall that is more hydrophilic than that of the structured wall and generally makes it possible to move the liquid by capillary action into the fluid array. The variable energies of the structured wall in the different segments S1, S2 of the channel make it possible to modulate this progression. When the wall having this third energy E3 is provided by the main surface of the upper cover 7, the surface may have been treated with a surface agent, for example, based on poloxamer, tending to increase the hydrophilic nature of this surface.

Of course, it is possible to provide a cartridge comprising a more complex fluid array than the one used in the example. Thus, an analysis path of the cartridge may include chambers other than the analysis chamber 5, such as, for example, one or a plurality of incubation chambers arranged upstream of the analysis chamber 5. These incubation chambers may comprise reagents distinct from those with which the fluid mixes before being transported into the analysis chamber 5. The array of channels 4, 4' can therefore also be more complex than the one shown in the figures, and extend into each analysis path, from the opening 2 to the vent 3, by fluidly connecting the different chambers according to any conceivable configuration.

Figure 3:
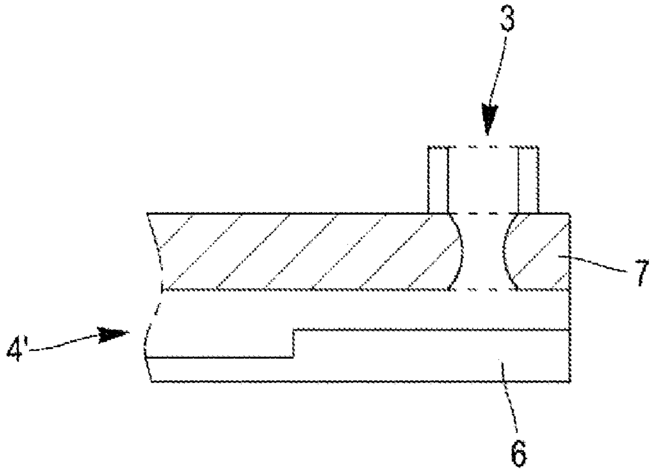
FIG. 3 shows a cross-section of the cartridge at the analysis chambers.
Figure 6:
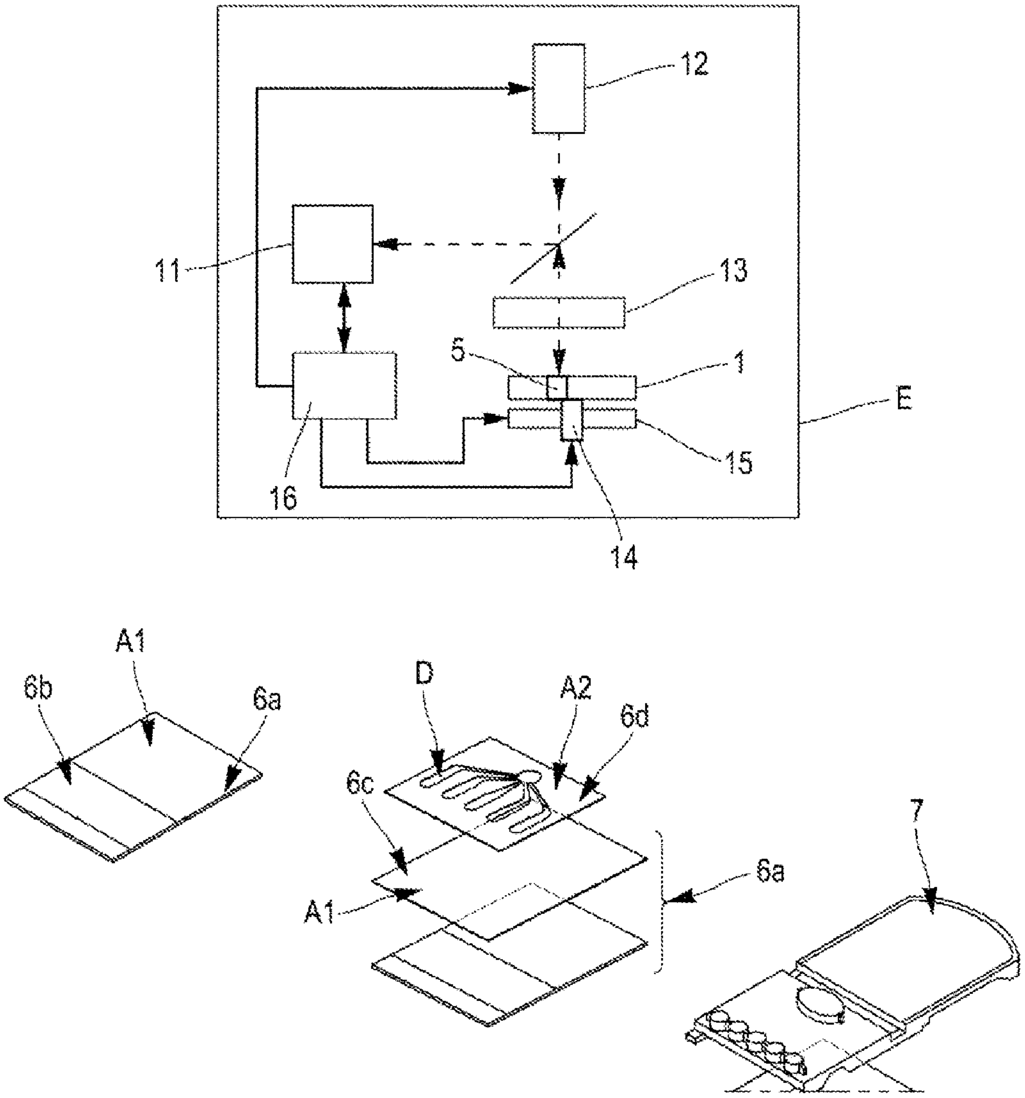
FIG. 6 shows other views of the elements making up a cartridge according to the present disclosure.

With reference to FIGS. 1B, 6 and 3, the latter figure representing a cross-section of a cartridge 1 at the analysis chambers 5, an embodiment of a cartridge 1 according to the present disclosure is described more precisely. The cartridge 1 of this embodiment makes it possible to apply a magnetic immunological analysis, thus implementing magnetic particles to mark the presence of the analyte in a sample of biological liquid. This embodiment also makes it possible to simply control the surface energies on the different upstream and downstream segments of the steps (or of the step) present in the fluidic array of this cartridge.

The support 6 is here composed of a rigid substrate 6*a* comprising a magnetic layer or zone 6*b*. The substrate 6*a* can be formed of a plastic material. The magnetic layer/zone 6*b* can be arranged on the substrate 6*a*, or integrated into this substrate, at least at the analysis chambers 5 of the fluid array.

It does not necessarily cover the entire surface of the substrate 6*a*.

The magnetic layer 6*b* is typically composed of magnetic composite materials, such as ferrites, randomly distributed in a polymer or oriented along a pre-orientation axis. This magnetic layer may be similar to a conventional magnetic recording tape.

The substrate 6*a* may also comprise a non-magnetic film 6*c* (or a plurality of such films) covering the magnetic layer 6*b*, and, more generally, the substrate 6*a*. This non-magnetic film 6*c* is optional; its purpose is to separate the magnetic layer 6*b* from the bottom of the analysis chamber 5 when the cartridge 1 has been formed by assembling the support 6 to the upper cover 7. In order not to disturb the measurement, the non-magnetic film 6*a* has a low autofluorescence. For reasons of clarity, "non-magnetic" denotes a material whose magnetic susceptibility is very low, such as a paramagnetic or diamagnetic material. The non-magnetic film 6*c* may, for example, be formed from a plastic material, such as polypropylene.

In every case, the substrate 6*a* has an exposed surface A1 that may consist of the substrate 6*a* itself or of the non-magnetic film 6*c* when the latter is present. This exposed surface A1 is intended to form the first section S1 of the structured wall of a channel of the fluid array of the cartridge. The exposed surface A1 is designed or has been treated to have the first surface energy E1, of hydrophilic nature. This first surface energy E1 may result from the choice of the material forming the exposed surface, or of its texturing or of a treatment, for example, with plasma or by means of a surfactant, aimed at making this surface particularly hydrophilic. As already stated, this first surface energy E1 may be characterized by a contact angle of between 50° and 80°.

Aside from the substrate 6*a*, the support 6 also comprises an interlayer film 6*d* arranged on the exposed surface A1 of the substrate 6*a*. The interlayer film 6*d* of FIG. 1B has a cutout according to a pattern corresponding to the array of upstream channels 4 and to the analysis chambers 5 and advantageously to the opening 2. In general, the interlayer film 6*d* has cutouts D aimed at defining a portion of the fluid array of the cartridge. When this interlayer film 6*d* is superficially assembled to the substrate 6*a* to form the support 6, the latter therefore has recesses reproducing the cutout pattern D of the interlayer film 6*d*. These recesses, in combination with complementary recesses formed in the upper cover 7, constitute the array of channels 4, 4', the analysis chambers 5, and any other element of the fluid array of the cartridge 1. It should be noted that the cutout pattern D of the interlayer film 6*d* of FIG. 1B does not use the impression of the vent channels 4', and that these are therefore exclusively formed by recesses formed in the upper cover 7 and not in the support 6. This arrangement leads to forming an upward step at the inlet of the vent channels 4', as in the previous example. More generally, the cutout pattern D of the interlayer film 6*d* corresponds to only part of the fluid array of the cartridge 1 in order to constitute the steps of this array.

The exposed surface A2 of the interlayer film 6*d* (comprising the face opposite the one brought into contact with the substrate 6*a*) is intended to form the second section S2 of the structured wall of a channel of the fluid array of the cartridge 1. It is designed or has been treated to have the second surface energy E2, also of hydrophilic nature, but less than the first surface energy E1. This second surface energy E2 may result from the choice of the material forming the interlayer film or its surface, or its texturing or a specific treatment. As already stated, this second surface energy E2 may be characterized by a contact angle of between 65° and 89° (while being greater than the first surface energy E1).

In this configuration, and when the interlayer film 6*d* having the cutouts D has been assembled to the substrate 6*a*, the main surface of the support 6 then consists of an exposed surface A2 of the interlayer film 6*d* having the second surface energy E2 and the exposed surface A1 of the substrate 6*a*, at the level of the cutouts D of the interlayer film 6*d*, having the second surface energy E2.

Advantageously, the interlayer film 6*d* is an adhesive film, also allowing the upper cover 7 to be assembled and hermetically sealed to the support 6 at their surfaces in contact, that is, surrounding the recesses. It may be a double-sided adhesive film, thus simultaneously ensuring its assembly to the substrate 6*a* and to the upper cover 7. As is well known per se, such a film consists of a strip, for example, plastic, both faces of which are coated with an adhesive material. Because of its nature, this adhesive material may naturally have a surface energy that is less than that of the exposed surface of the substrate 6*a* and thus constitutes the second surface energy.

Whether it is formed from a double-sided adhesive interlayer film or not, the cartridge 1 is assembled by supplying the substrate 6*a* provided with the magnetic zone 6*b*, by arranging the interlayer film 6*d* on this substrate 6*a* and thus forming the support 6, then by assembling this assembly to the upper cover 7. This assembly is achieved by aligning the complementary recesses arranged on the main surface of this upper cover 7 onto those defined by the cutout pattern D of the interlayer layer 6*d* of the support 6. In this way, the fluid array of the cartridge 1 is defined.

It is naturally possible to provide other films on the interlayer film 6*d* that have other cutout patterns so as to form a plurality of consecutive upward or downward steps in a channel in the fluidic array. Care will be taken in this case to preserve the relationship according to which, at each step, the surface energy of the segment of the channel having the greatest height is greater than the surface energy of the channel segment having the smallest height.

Figure 4:
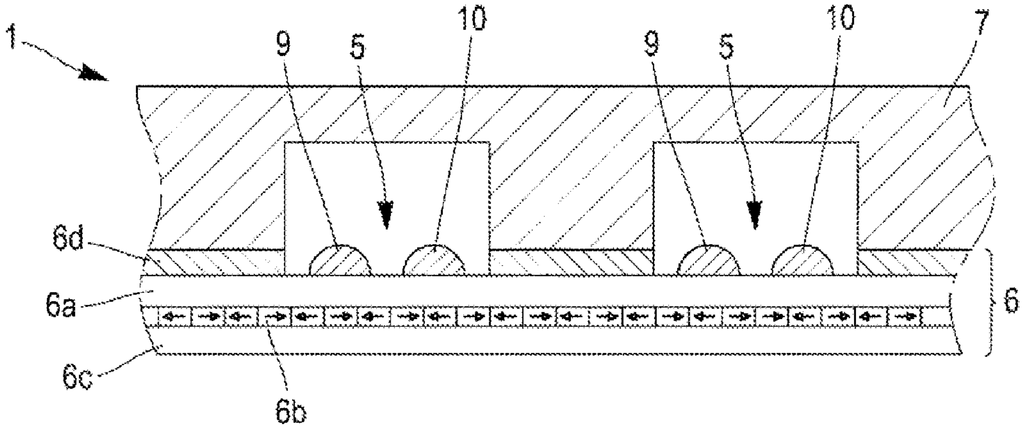
FIG. 4 schematically shows, in plan view, a detection pattern defined by the magnetization produced by a magnetic layer integrated into the support of a cartridge, the magnetic field present in an analysis chamber and the norm of this field.

Returning to the description of the magnetic nature of the cartridge, the magnetic layer 6*b* comprises a succession of regions polarized in two different directions (opposite in FIG. 3). As shown in FIG. 4, which shows, in top view, magnetic layer 6*b*, the magnetically polarized regions extend in line in a main direction P in the shown example.

At the interfaces between two different polarizations zones, regions of relatively strong magnetic intensity are created, referred to as attraction zones in the rest of this description. The attraction zones are therefore arranged in the form of a plurality of lines Za oriented in the main direction P. The particular arrangement of these lines defines, in combination, a detection pattern.

It is understood that the in-line arrangement taken in an example only forms a particular case of a detection pattern. A cartridge 1 is more generally provided with magnetically polarized regions defining a well-determined detection pattern, but the configuration of which can be freely chosen.

FIG. 4 also shows the field Bc generated by the magnetic layer 6*b* and the norm of this field. As will be explained below, it may be useful to add an additional external field Bext to the field produced by the magnetic layer 6*b*. FIG. 4 shows this external field Bext, which combines with the field Bc produced by the layer and the norm of this combined field. It is observed that the application of this external magnetic field Bext can lead to eliminating certain attraction zones Za produced when only the field provided by the magnetic layer 6*b* is present; however, in every case, these attraction zones are arranged along lines Za oriented in the main direction P, or, more generally, according to a detection pattern, the features of which are fully determined.

In the case of a chamber 5 having the dimensions indicated above, it is possible to consider forming a detection pattern comprising between 2 and 50 lines, the lines having a thickness of between 1 and 150 microns (advantageously between 5 and 30 microns) and separated from each other by a spacing of between 5 and 300 microns, advantageously between 25 and 150 microns.

Returning to the description of FIG. 3, the cartridge 1 has been prepared to place, in each chamber 5, a controlled quantity of magnetic particles 9 of nanometric dimensions, typically between 25 nm and 500 nm, and preferentially between 100 and 260 nm. These particles are typically in the form of beads having superparamagnetic features and are biocompatible. They may, in particular, be covered with a polymer (of polystyrene type) having a surface treatment that allows them to be functionalized with type Ac or Ag proteins. The magnetic particles are bound to capture elements capable of associating with the analyte. The controlled quantity of the particles is such that their concentration in the volume of the chamber once filled with the biological liquid is between $10^6$ and $10^{11}$ particles/ml. The controlled quantity of nanoparticles and capture elements is here arranged in the form of a dry cluster 9 resting on the support 6 of the chamber 5.

Similarly, the chambers 5 also each contain a dry cluster 10 of detection elements. These detection elements are also capable of binding to the analyte, and they carry photoluminescent markers, for example, fluorescent markers.

The dry clusters 9, 10 of capture and detection elements are also visible in FIG. 1B. They can be placed on the support 6 at locations corresponding to the position of the analysis chambers 5, before the upper cover 7 is placed on the support 6. Recesses of the support 6 can be used, which, in particular, define the cavity of the chambers 5, in order to identify these locations.

When the biological liquid to be analyzed is introduced into the cartridge 1, the liquid flows into the array of channels 4 to fill the analysis chambers 5 and propagate into the vent channels 4'. The presence of at least one step (and of the variation in surface energy upstream and downstream of this step) in these channels 4, 4' ensures the proper filling, in a specified time, of all the analysis chambers 5, as has been specified in a previous paragraph. The detection elements 10 and the capture elements associated with the magnetic particles 9 are respectively resuspended in the sample of each chamber 5 in order to mix therewith. During the following reaction time, and when the analyte is present in the sample, complexes are formed comprising a capture element, a magnetic particle, the analyte, and a detection element. These complexes are immobilized on the support 6 of each chamber 5 by agglomerating in a preferred manner at the magnetic field of maximum intensity, and therefore in order to be arranged according to the detection pattern defined by the magnetic layer 6*b*. The excess detection elements remain suspended in the sample.

Provision may be made for each chamber 5 of a cartridge 1 to be prepared to receive capture elements and detection elements of different natures, so as to carry out multiple analyses of the biological liquid introduced into the cartridge 1. Provision may also be made for the detection pattern encoded by the portion of the magnetic layer 6*b* that is arranged at a chamber 5 to be different from one chamber to the other.

In every case, the presence of an analyte in the sample retained in an analysis chamber 5 leads to forming a detection pattern defined by the magnetic layer 6*b*.

Figure 5:
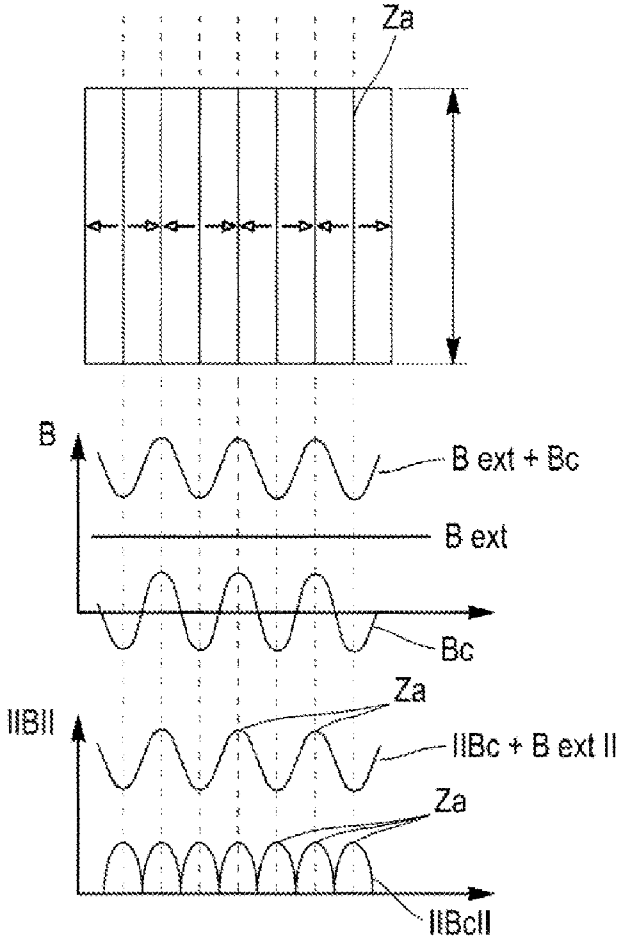
FIG. 5 shows an analysis device for operating a cartridge according to the present disclosure.

In order to fully control the phenomena that occur in an analysis chamber during the reaction period and detect the presence and intensity of the detection pattern at the end of this period, it is advantageous to place the cartridge 1 in or on an analysis device shown schematically in FIG. 5.

The device E comprises elements for receiving the cartridge 1 in order to position it as precisely as possible in an analysis position. In this position, at least one chamber 5 of the cartridge 1 is arranged in the field of an image capturing device 11, such as an image sensor. This chamber 5 is also arranged in the illumination field of a light source 12, for example, a light-emitting diode-based source. It is also possible to provide for the optical path between the light source 12, the chamber 5 and the image capturing device 11 of the optical elements 13 such as separators, filters, lenses in order to improve the quality of the picture taking and, in particular, to choose suitable magnification and depth of field. It is possible, with this arrangement, to acquire a digital image of the sample and of the support 6 of the chamber 5, in order to reveal on the image the light intensity produced by the fluorescent markers. The cartridge 1 is of course arranged in the analysis device so that the upper cover 7, transparent at least in front of the chambers 5, is in the optical path in order to allow this image capture.

In operation, the photoluminescent markers in solution in the sample or immobilized on the support 6 of the illuminated chamber 5 are activated by means of the light source 12 and made visible in the image plane of the image capturing device 11. A digital image of the distribution can thus be acquired in the plane of the support of the photoluminescent markers.

Continuing the description of the analysis device E of FIG. 3, the device may also comprise a mechanical actuator 14, for example, a piezoelectric actuator, capable of coming into contact with the support 6 of the cartridge in order to apply vibratory forces thereto. The mechanical actuator 14 can be activated after the cartridge is inserted into or onto the device E so as to allow effective resuspension of the capture elements, magnetic particles and detection elements 9, 10 in the sample.

Finally, the device E can comprise a magnetic field source 15, for example, an electromagnet, which can be activated so as to increase the magnetic field produced by the magnetic layer 6*b*. The magnetic field produced by the source 15 may be between 1 and 400 mT at the chamber 5, but it must in every case remain of intensity less than the value of the coercive field of the magnetic layer 6*b* so as to preserve its magnetization, and the detection pattern that this magnetization defines. The field produced by the source 15 is preferably oriented orthogonally to the surface of the support 6 in order to add to the field generated by the magnetic layer 6*b*, and thus to increase the intensity of the magnetic field in the attraction zones Za, and to reinforce the detection pattern. As seen previously, the presence of this field can lead to modifying the in-line arrangement Za of the attraction zones, or, more generally, to redefine the detection pattern. The field produced by the source 15 can be continuous or pulsed, in this case with a pulse duration typically greater than 1 ms. The field produced by the source 15 also makes it possible to magnetize the superparamagnetic particles of the sample. In this way, the migration of these particles and complexes is facilitated when they are present toward the surface of the support 6 in order to immobilize them.

In order to operate the analysis device E and to carry out the digital processing of the image that has been acquired, the device E also comprises a computing device 16. This may be a microcontroller, a microprocessor, an FPGA circuit. In addition to the computing means strictly speaking, the computing device 16 also comprises memory components making it possible to store data and computer programs enabling the device E to be operated. The computing device 16 can also comprise interface components for exchanging data (of the USB interface type) or making it possible to connect the analysis device E to maintenance equipment. The interface components can also comprise a screen and control buttons to allow the use of the device E by an operator. The computing device 16 is connected, for example, by means of an internal bus, to the image capturing device 11, to the light source 12, to the mechanical actuator 14, to the magnetic field source 15 in order to coordinate their actions and/or to collect the data produced, for example, the digital images provided by the image capturing device 11.

Thus, once the cartridge 1 is placed in or on the analysis device E by an operator, retained by the receiving elements in the analysis position, the following sequence of actions can be implemented by the computing device 16, for example, after the device E has been actuated by means of a control button:

- activation of the mechanical actuator 14 in order to apply a vibratory force to the cartridge 1 and to engage or promote the resuspension of the capture elements, the magnetic particles and the detection elements in the sample. This activation instant marks the start of the capture period;
- activation of the magnetic field source 15 to promote the immobilization of the magnetic particles, complexed with analytes or not, on the support 6 of the chamber 5;
- switching on the light source 12, then upon expiry of the capture period, activation of the image capturing device 11 in order to acquire an image of the sample and the support. The image can be transferred from the image capturing device 11 to a memory component of the computing device 16 in order to be able to perform processing operations therein.
- processing the image to determine a detection signal representative of the presence or concentration of the analyte in the sample.
- processing the detection signal to provide information indicating the presence, absence and/or concentration of the analyte in the sample in a standard measurement, for example, in part per ml.

Of course, the present disclosure is not limited to the embodiment described and variant embodiments can be added thereto without departing from the scope of the present disclosure as defined by the claims.

The invention claimed is:

1. An analysis cartridge for analyzing a biological liquid comprising a liquid pour opening emptying into an array of channels in which the biological liquid seeps by capillary action, the array of channels defining a plurality of analysis paths each comprising an analysis chamber, the array of channels comprising for each analysis path an upstream channel for fluidly connecting the opening to the analysis chamber, and a vent channel for fluidly connecting the analysis chamber to a vent, the analysis cartridge including a support having a main surface and an upper cover formed at least in part of a transparent material and also having a main surface, the upper cover and the support being assembled one to another by their main surface, at least a portion of the array of channels including complementary recesses formed in part on the main surface of the support and in part on the main surface of the upper cover, each channel being defined by a structured channel wall provided by the support and by an opposite channel wall provided by the upper cover, the two walls facing each other and defining a channel height, the structured wall having at least one step defining on either side of the at least one step:

- a first segment of the channel in which the structured wall has a first surface energy and a first elevation defining a first height of the channel; and
- a second segment of the channel in which the structured wall has a second surface energy and a second elevation defining a second height of the channel;
  - the first height of the channel and the first surface energy of the structured wall being greater than the second height of the channel and the second surface energy, respectively;
  - the support further comprising:
- a rigid substrate having the first surface energy, the rigid substrate incorporating a magnetic layer disposed under a non-magnetic film covering the magnetic layer; and
- an interlayer film having the second surface energy, the interlayer film disposed on the rigid substrate, the interlayer film defining part of the array of channels of the analysis cartridge and having a cutout pattern for forming the complimentary recesses of the support and uncovering an exposed surface of the rigid substrate,
  - wherein the main surface of the support comprises an exposed surface of the interlayer film having the second energy of surface and the exposed surface of the rigid substrate having the first surface energy.

2. The analysis cartridge of claim 1, wherein the channel wall facing the structured wall is planar and has a third surface energy greater than the first surface energy and the second surface energy.

3. The analysis cartridge of claim 2, wherein the at least one step has a flank, and the surface energy of the flank of the at least one step is closer to the first energy than to the second energy.

4. The analysis cartridge of claim 3, wherein the main surfaces of the support and the upper cover have a hydrophilic character.

5. The analysis cartridge of claim 4, wherein the at least one step includes a step disposed in at least one vent channel and reduces the height of the at least one vent channel in a direction of flow of the fluid.

6. The analysis cartridge of claim 5, further comprising at least one incubation chamber fluidly disposed upstream of at least one analysis chamber in at least one analysis path.

7. The analysis cartridge of claim 6, further comprising at least one reagent in the at least one analysis path.

8. The analysis cartridge of claim 7, wherein the at least one reagent comprises photoluminescent markers, and at least a part of the upper cover that overhangs the at least one analysis chamber comprises a material transparent in a wavelength range of the photoluminescent markers.

9. The analysis cartridge of claim 8, wherein at least a portion of the upper cover has an optically polished exterior surface.

10. The analysis cartridge of claim 1, wherein the opening is surmounted by a reservoir and the vents are respectively surmounted by peripheral walls having a height at least equal to a height of the reservoir.

11. The analysis cartridge of claim 1, wherein the interlayer film is an adhesive film.

12. The analysis cartridge of claim 11, wherein the interlayer film is a double-sided adhesive film.

13. The analysis cartridge of claim 1, wherein the magnetic layer comprises magnetically polarized regions defining a detection pattern.

14. The analysis cartridge of claim 1, wherein the at least one step has a flank, and the surface energy of the flank of the at least one step is closer to the first energy than to the second energy.

15. The analysis cartridge of claim 1, wherein the main surfaces of the support and the upper cover have a hydrophilic character.

16. The analysis cartridge of claim 1, wherein the at least one step includes a step disposed in at least one vent channel and reduces the height of the at least one vent channel in a direction of flow of the fluid.

17. The analysis cartridge of claim 1, further comprising at least one incubation chamber fluidly disposed upstream of at least one analysis chamber.

18. The analysis cartridge of claim 17, wherein the analysis chamber and/or the incubation chamber comprises at least one reagent.

19. The analysis cartridge of claim 18, wherein the at least one reagent comprises photoluminescent markers, and at least a part of the upper cover that overhangs the analysis chambers comprises a material transparent in a wavelength range of the photoluminescent markers.

20. A method for manufacturing a cartridge according to claim 1, comprising providing the support and the upper cover and assembling the support to the upper cover by placing their respective main surfaces facing one another and thus forming the channels.

* * * * *